United States Patent
Belhabib

(10) Patent No.: US 11,592,356 B2
(45) Date of Patent: Feb. 28, 2023

(54) SYSTEM AND METHOD FOR MONITORING THE WEAR OF A FREE-WHEEL AND ASSOCIATED APPARATUS

(71) Applicant: AIRBUS HELICOPTERS, Marignane (FR)

(72) Inventor: Gilles Belhabib, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 152 days.

(21) Appl. No.: 17/205,096

(22) Filed: Mar. 18, 2021

(65) Prior Publication Data

US 2021/0364387 A1    Nov. 25, 2021

(30) Foreign Application Priority Data

May 20, 2020   (FR) ...................................... 2005185

(51) Int. Cl.
  *G01M 13/028* (2019.01)
  *B64C 25/34* (2006.01)
  *B64D 45/00* (2006.01)

(52) U.S. Cl.
  CPC ........... *G01M 13/028* (2013.01); *B64C 25/34* (2013.01); *B64D 45/00* (2013.01); *B64D 2045/0085* (2013.01)

(58) Field of Classification Search
  CPC ...... G01M 13/028; B64C 25/34; B64D 45/00; B64D 2045/0085
  See application file for complete search history.

(56) References Cited

U.S. PATENT DOCUMENTS

| | | | | |
|---|---|---|---|---|
| 2013/0116937 A1* | 5/2013 | Calhoun | ............. | G01M 13/028 702/35 |
| 2013/0180319 A1* | 7/2013 | Klein-Hitpass | ..... | G01M 13/028 73/54.02 |
| 2015/0367951 A1* | 12/2015 | Massot | ................... | F02C 6/206 701/3 |

(Continued)

FOREIGN PATENT DOCUMENTS

| | | |
|---|---|---|
| EP | 3473805 A1 | 4/2019 |
| FR | 3049036 A1 | 9/2017 |
| WO | 199527183 A1 | 10/1995 |

OTHER PUBLICATIONS

"USAAMRDL-TR-77-18 Helicopter Freewheel Unit Design Guide", Oct. 31, 1977 (Oct. 31, 1977), pp. 1-240.

(Continued)

*Primary Examiner* — Natalie Huls
*Assistant Examiner* — Cynthia L Davis
(74) *Attorney, Agent, or Firm* — Brooks Kushman P.C.

(57) ABSTRACT

A method for detecting wear before failure of a free-wheel, the free-wheel comprising a driving part integrated into an upstream mechanical power transmission system and a driven part integrated into a downstream mechanical power transmission system. The method comprises determining an oscillation measurement of a monitoring parameter within the upstream or downstream mechanical power transmission system, determining a value of at least one dynamic parameter characteristic of the oscillation measurement or of a transform of the oscillation measurement in a frequency reference frame, and generating an alarm when the value of the dynamic parameter reaches at least one wear threshold.

20 Claims, 5 Drawing Sheets

(56) References Cited

U.S. PATENT DOCUMENTS

2016/0304192 A1* 10/2016 Hale .................. G01M 13/045
2017/0267364 A1 9/2017 Fraenzel
2017/0341773 A1* 11/2017 North ................ B64D 45/0005

OTHER PUBLICATIONS

French Search Report for French Application No. FR2005185, Completed by the French Patent Office, dated Feb. 8, 2021,10 pages.

\* cited by examiner

SYSTEM AND METHOD FOR MONITORING THE WEAR OF A FREE-WHEEL AND ASSOCIATED APPARATUS

CROSS REFERENCE TO RELATED APPLICATIONS

This application claims priority to French patent application No. FR 2005185 filed on May 20, 2020, the disclosure of which is incorporated in its entirety by reference herein.

BACKGROUND OF THE INVENTION

(1) Field of the Invention

The present invention relates to a system and a method for monitoring the wear of a free-wheel, and to an apparatus comprising an aircraft and this system.

(2) Description of Related Art

Conventionally, a rotary-wing aircraft comprises a rotor providing at least partial lift for the aircraft. This rotor may also participate at least partially in the propulsion of the aircraft. Thus, a helicopter comprises a main rotor ensuring its lift and propulsion.

This rotor is rotated by a power plant comprising at least one engine and a gearbox set in motion by the engine or engines.

Furthermore, the power plant may comprise at least one free-wheel provided with a driving part connected to the engine and a driven part connected to the rotor. The free-wheel may be arranged within an engine, or within the gearbox or even within a mechanical system connecting an engine to the gearbox. For example, the gearbox may include one mechanical input system for transmitting torque per engine, each mechanical input system for transmitting torque including a free-wheel.

A free-wheel is likely to deteriorate through use. Free-wheels are therefore replaced before reaching a pronounced level of wear. The pronounced level of wear represents, for example, a level of wear making the free-wheel faulty and, for example, slipping.

Free-wheels as such are inspected during scheduled maintenance operations in order to be replaced before they become faulty. When a free-wheel is arranged in a gearbox, a maintenance operation is scheduled for the gearbox in order to inspect the free-wheel and replace it if its wear is greater than a predetermined wear threshold. Such a maintenance operation requires the gearbox to be disassembled in order to inspect the free-wheel and replace it if necessary. Such a maintenance operation is actually relatively complex.

Document FR 3049036 describes a method for identifying whether a free-wheel is faulty. The operating state of the free-wheel is considered incorrect if the speed of rotation of an input shaft does not lie within a second range of values when the speed of rotation of the rotor lies within a first range of values.

This teaching is advantageous because it makes it possible to detect the presence of a faulty free-wheel, but it is not intended to evaluate a level of wear of the free-wheel in order to carry out a maintenance operation before this free-wheel fails.

Document EP 3473805 is far removed from the problem of evaluating the wear of a free-wheel, since it relates to the torsion of a shaft. This document describes a system provided with a shaft equipped with a phonic wheel and with a sensor cooperating with the phonic wheel. A processing unit is coupled to the sensor in order to determine a torsional vibration mode of the shaft based on the measurement taken.

Document WO 95/27183 is also far removed from the problem of evaluating the wear of a free-wheel, since it relates to a method for determining a resonance frequency of a member of an engine.

Document US 2015/367951 describes a monitoring system that includes a first measuring device for measuring the torque exerted on the upstream portion of a power transmission system and a second measuring device for measuring the speed of rotation of a gas generator. The monitoring system further has a processing unit connected to the turboshaft engine as well as to the first measuring device and to the second measuring device in order to automatically stop the turboshaft engine when the torque is lower than a torque threshold at the same time that said speed of rotation of the gas generator is higher than a speed threshold.

Document "USAAMRDL-TR-77-18 HELICOPTER FREEWHEEL UNIT DESIGN GUIDE", Oct. 31, 1977 (1977 Oct. 31), pages 1-240, XP055773387 is also known.

BRIEF SUMMARY OF THE INVENTION

An object of the present invention is thus to propose a method for evaluating the wear of a free-wheel of a power plant of a rotorcraft and for anticipating a failure of the free-wheel.

The invention thus relates to a method for detecting/evaluating wear before failure and/or for monitoring for maintenance purposes, a free-wheel of a mechanical system, for example an aircraft, said mechanical system being provided with a rotating part to be rotated with an engine, said free-wheel comprising a driving part integrated into an upstream mechanical power transmission system connected to the engine, namely to a member of an engine, said free-wheel comprising a driven part integrated into a downstream mechanical power transmission system connected at least to the rotating part.

This method includes the following steps, during an analysis phase:

determining, for example over a period of time, an oscillation measurement varying as a function of time of a first monitoring parameter within the upstream or downstream mechanical power transmission system, using at least one first measuring device;

determining a value of at least one dynamic parameter, with a processing computer, said at least one dynamic parameter being a characteristic of the oscillation measurement in a time reference frame or a characteristic of a transform of the oscillation measurement in a frequency reference frame; and generating, with an alerter in communication with the processing computer, an alarm when said value of said at least one dynamic parameter reaches at least one wear threshold associated with said dynamic parameter and stored in the processing computer.

The expression "reaches at least one wear threshold" means that the associated dynamic parameter has a value that becomes equal to or even passes the wear threshold, either by being greater than or equal to this wear threshold when the wear threshold is an upper limit, or by being less than or equal to this wear threshold when the wear threshold is a lower limit. According to one example, in normal conditions, the dynamic parameter may lie within a range of values delimited by two wear thresholds. As soon as the dynamic parameter exits this range, the alarm is generated.

A free-wheel is said to be "engaged" or "synchronized" when its driving part rotates its driven part. Conversely, if the speed of rotation of the driven part is greater than the speed of rotation of the driving part, the free-wheel is said to be "disengaged" or "desynchronized".

The free-wheel can be engaged at various times, for example when the engine is started, after a restart or indeed after an autorotation phase. When the free-wheel changes from a disengaged mode of operation to an engaged mode of operation, the first monitoring parameter has a value that tends to oscillate over a period of time. The shape of this oscillation depends on the mechanical properties of the free-wheel and consequently on its level of wear.

Therefore, according to the method of the invention, during an analysis phase, a sensor acquires a first measurement signal, the first measurement signal carrying the value of the first monitoring parameter in the upstream or downstream mechanical power transmission system.

Thus, the first measuring device emits a first measurement signal carrying a value relative to the first monitoring parameter and, for example, an electrical voltage representative of the first monitoring parameter. This first measurement signal may be the oscillation measurement or may be processed by the processing computer in order to obtain the oscillation measurement. Consequently, either the processing computer receives a first measurement signal forming the oscillation measurement, or the processing computer processes this first measurement signal in order to obtain the oscillation measurement.

In a time reference frame having the first monitoring parameter on the ordinate and time on the abscissa, or in a frequency reference frame, the oscillating measurement describes a function that has at least one dynamic parameter representative of the wear of the free-wheel. Each dynamic parameter is a characteristic of the oscillation measurement in the time reference frame or of a transform of the oscillation measurement in a frequency reference frame.

The processing computer can then compare each dynamic parameter with at least one predetermined wear threshold specific to it. Each wear threshold may be determined by calculations or by testing with a free-wheel exhibiting acceptable wear but requiring a maintenance operation. For example, an oscillation measurement is determined with such a free-wheel exhibiting acceptable wear, the value of the dynamic parameter obtained with this oscillation measurement representing said wear threshold.

If at least one dynamic parameter has a value that reaches the value of its wear threshold, an alarm is emitted for a maintenance operation to be performed. An operator will then be able to determine if the free-wheel is actually worn.

This method tends to require detailed inspection of the free-wheel before failure and only when this free-wheel is judged to be worn or possibly worn, unlike a method providing for preventive maintenance or a method monitoring a possible failure.

The method may be carried out in whole or in part within the mechanical system to be monitored, for example a vehicle and, in particular, an aircraft. Similarly, the processing computer may comprise one or more computers that may or may not be embedded in the mechanical system to be monitored.

Optionally, the method may be implemented with devices present on certain aircraft.

This method can be applied independently to each free-wheel, for example within an installation comprising several engines each cooperating with one free-wheel.

This method may also include one or more of the following characteristics.

According to one aspect, said at least one wear threshold may be a threshold reached when said free-wheel is worn and not slipping.

The wear threshold of a dynamic parameter can be calculated in order to guarantee that the free-wheel can perform a complete flight in the most adverse conditions without failing. Thus, if the wear threshold is reached at the beginning of a flight, the entire mission can be performed in a secure manner.

According to another aspect compatible with the preceding aspect, the first monitoring parameter may be a physical parameter such as speed of rotation, angular position, angular acceleration, mechanical torque or mechanical stress.

The oscillation measurement may be obtained from a variation in the speed of rotation of a member of the upstream or downstream mechanical power transmission system, or even from a difference in speeds of rotation between a member of the upstream mechanical power transmission system and a member of the downstream mechanical power transmission system.

Alternatively, the oscillation measurement may result from a variation in an angular position with respect to a reference or from an angular acceleration of a member of the upstream or downstream mechanical power transmission system, or even from a difference in angular positions with respect to a reference or in angular accelerations between a member of the upstream mechanical power transmission system and a member of the downstream mechanical power transmission system.

Alternatively, the oscillation measurement may result from a variation in a mechanical torque exerted on a member of the upstream or downstream mechanical power transmission system, or even from a difference in mechanical torques between a member of the upstream mechanical power transmission system and a member of the downstream mechanical power transmission system.

Alternatively, the oscillation measurement may result from a variation in a mechanical stress exerted on a member of the upstream or downstream mechanical power transmission system, or even from a difference between a stress, for example shear stress, exerted on the upstream mechanical power transmission system and a mechanical stress of the same kind exerted on the downstream mechanical power transmission system.

According to another aspect compatible with the preceding aspects, the method may include a step of measuring said value of the first monitoring parameter within the upstream or downstream mechanical power transmission system.

According to a method making it possible to filter the measurement of said value of the monitoring parameter within the upstream mechanical power transmission system, the method may also comprise a step of measuring a value of a second monitoring parameter within the upstream or downstream mechanical power transmission system that is not the subject of the first monitoring parameter. The first monitoring parameter and the second monitoring parameter relate to the same physical parameter and therefore, for example, both relate to a speed of rotation or both relate to a mechanical torque or both relate to a mechanical stress, or to an angular position or to an angular acceleration.

For example, the first measurement of the value of the first monitoring parameter within the upstream mechanical power transmission system may be carried out on a drive shaft and, where appropriate, the second measurement of the value of the second monitoring parameter within the downstream mechanical power transmission system may be carried out on a rotor mast. However, the measurements can be carried out at other measurement points such as, for example, a section of the downstream mechanical power transmission system leading to a member other than the rotary wing and, for example, to an accessory gearbox or a rotor for controlling the yaw movement, etc.

The measurements are advantageously carried out as close as possible to the free-wheel for better accuracy.

The oscillation measurement can therefore be obtained by means of a first measurement signal emitted by the first measuring device. The first measurement signal can be raw or processed by requesting a second measurement signal originating from the second measuring device or even by sampling.

The following paragraphs illustrate various ways of obtaining the oscillation measurement.

According to one example, determining an oscillation measurement comprises producing a first measurement signal as a function of time with the first measuring device, said oscillation measurement being:

either a continuous curve as a function of time corresponding to the first unfiltered measurement signal;

or a continuous curve as a function of time corresponding to the first measurement signal filtered at least by subtracting a second measurement signal generated by a second measuring device measuring a second monitoring parameter within the upstream or downstream mechanical power transmission system that is not the subject of the first monitoring parameter, the first monitoring parameter and the second monitoring parameter being relative to the same physical parameter.

According to one example, said determination of an oscillation measurement comprises the following steps:

producing a first measurement signal as a function of time with the first measuring device, the first measurement signal being unfiltered or filtered at least by subtracting a second measurement signal as a function of time generated by a second measuring device measuring a second monitoring parameter within the upstream or downstream mechanical power transmission system that is not the subject of the first monitoring parameter, the first monitoring parameter and the second monitoring parameter being relative to the same physical parameter; and generating a plurality of measurement points as a function of time by sampling said filtered or unfiltered first measurement signal, said oscillation measurement being a discontinuous oscillating curve as a function of time comprising said measurement points.

Each sampling step described above or below may comprise a step of segmenting the signal in question according to a sampling frequency, or even a step of converting the physical quantity that is the subject of the signal into the physical quantity of the monitoring parameter. For example, the first measurement signal represents an electrical voltage, the first measurement signal being segmented and each obtained point then being transformed into an angular velocity.

According to one example, said determination of an oscillation measurement includes the following steps:

producing a first measurement signal as a function of time with the first measuring device;

generating a plurality of first intermediate points by sampling said first measurement signal;

producing a second measurement signal with a second measuring device measuring a second monitoring parameter within the upstream or downstream mechanical power transmission system that is not the subject of the first monitoring parameter, the first monitoring parameter and the second monitoring parameter being relative to the same physical parameter;

generating a plurality of second intermediate points by sampling said second measurement signal; and generating a plurality of measurement points by subtracting the second intermediate points from the first intermediate points, said oscillation measurement being a discontinuous oscillating curve as a function of time comprising said measurement points.

Furthermore, at least one dynamic parameter may be in one of the following forms.

According to another aspect compatible with the preceding aspects, said at least one dynamic parameter may comprise a pseudo-pulse omg of said oscillation measurement, said at least one associated wear threshold being a pseudo-pulse threshold.

According to another aspect compatible with the preceding aspects, said at least one dynamic parameter may comprise a damping coefficient of said oscillation measurement, said at least one associated wear threshold being a damping threshold.

Optionally, one or both of the preceding dynamic parameters, or even other parameters, are used.

According to another aspect compatible with the preceding aspects, said step of determining a value of at least one dynamic parameter in said time reference frame comprises the following step: adjusting a value of said at least one dynamic parameter within a mathematical function stored in the processing computer, and, if required, of the wear parameters, so that said mathematical function is separated from a function described by the oscillation measurement by a space less than a threshold.

According to this method, a predetermined mathematical function is stored and comprises one or more coefficients each representing a dynamic parameter. The processing computer therefore varies the value of each coefficient such that the predetermined function can be substantially superimposed, to within a margin, on the oscillation measurement. Optionally, the method may provide for a maximum number of measurement points to be ignored in order to take account of any measurement errors.

For example, and as indicated above, the first monitoring parameter may be a speed of rotation. The mathematical function can then be in the following form:

$$V=X*(-L*\exp(-L*t)*\cos(omg*t+phi)-omg*\exp(-L*t)*\sin(omg*t+phi))$$

where "V" represents a speed on the ordinate (Y-axis) in a graph showing time t on the abscissa (X-axis), "t" represents time, "X" represents an amplitude, "L" represents a dynamic parameter of the damping coefficient type, "omg" represents a dynamic parameter of the pseudo-pulse type, "phi" represents a phase, "exp" represents the exponential function, "cos" represents the cosine function, "sin" represents the sine function, "=" represents the equals sign, "*" represents the multiplication sign, "+" represents the addition sign, "−" represents the subtraction sign.

Alternatively, said determination of a value of at least one dynamic parameter in said frequency reference frame comprises the following step: identifying a value of said at least one dynamic parameter of said transform of the oscillation measurement in a frequency reference frame.

The oscillation measurement can be expressed in the time reference frame. Consequently, the oscillation measurement may be expressed in the frequency reference frame by a function obtained by transforming the oscillation measurement by means of a spectral analysis or by means of a fast or discrete Fourier transform, for example, or by other means.

For example, when the function described by the oscillation measurement in the frequency reference frame provides an amplitude density as a function of frequencies, said determination of a value of at least one dynamic parameter comprises the determination at least of one frequency or of one amplitude density of a predetermined spectral line of said transform of the oscillation measurement in a frequency reference frame, said at least one dynamic parameter being said frequency or said amplitude density.

According to another aspect compatible with the preceding aspects, said method may include a step of determining an engagement period of the free-wheel during which the driving part begins to drive the driven part, said analysis phase being initiated during said engagement period.

For example, this analysis phase may be initiated when a speed of rotation of the driving part is equal to a speed of rotation of the driven part, to within a second predetermined margin.

This condition may be evaluated, for example, by comparing the speed of rotation of a member of the upstream mechanical power transmission system with the speed of rotation of a member of the downstream mechanical power transmission system.

The processing computer can thus detect an instant corresponding to the engagement or to the imminent engagement of the free-wheel and only carry out the analysis phase within a time interval starting from this instant or just after it, namely at the measurement point following engagement, for example so as not to unnecessarily monopolize calculation resources.

For example, the values of the first monitoring parameter and, if required, of the second monitoring parameter are analyzed substantially from this instant and optionally during a time period and, for example, either for a predetermined time, or until these values are substantially equal for a predetermined time in order to facilitate the calculations.

At the end of this period of time, the processing computer compiles the measurements and determines the value of each dynamic parameter for comparison with at least one corresponding wear threshold.

According to another aspect compatible with the preceding aspects, the method may include a step of determining a remaining service life of said free-wheel as a function of a difference between said value of said at least one dynamic parameter and said at least one associated wear threshold.

The method can thus be predictive of a service life and of a maintenance operation.

For example, the processing computer includes, for each dynamic parameter, a law providing a service life as a function of the difference between the value of this dynamic parameter and a corresponding wear threshold. Such a law is established, for example, by tests using several different free-wheels having different wear levels. In the presence of several wear parameters, the shortest service life determined in this way is assigned to the free-wheel. If the service life is negative, the above-mentioned alarm is emitted. For example, the calculated service life is displayed and/or stored. According to one possibility, the emission of an alarm consists in signaling a zero or negative service life via existing means.

In addition to a method, the invention relates to a system applying this method and, therefore, to a monitoring system in particular for detecting wear before failure of a free-wheel of a mechanical system, said mechanical system being provided with a rotating part, said free-wheel comprising a driving part integrated into an upstream mechanical power transmission system connected to an engine, said free-wheel comprising a driven part integrated into a downstream mechanical power transmission system connected at least to the rotating part.

This monitoring system is configured to apply the method of the invention, the monitoring system comprising a first measuring device for measuring said first monitoring parameter within the upstream or downstream mechanical power transmission system in the mounted position, said monitoring system having said processing computer connected, in the mounted position, to said alerter and to the first measuring device.

The expression "in the mounted position" refers to the installation of the member in question, possibly temporarily, within the mechanical system.

Optionally, this monitoring system may comprise a second measuring device for measuring, in the mounted position, a second monitoring parameter within the upstream or downstream mechanical power transmission system that is not the subject of the first monitoring parameter, said processing computer being connected in the mounted position to said second measuring device.

Optionally, the first measuring device and, where appropriate, the second measuring device, may each comprise a speed sensor or a position sensor or even a derivator or an acceleration sensor or even an integrator. For example, a speed sensor comprises an encoder wheel cooperating with a standard sensor.

Alternatively, the first measuring device and, where appropriate, the second measuring device may each comprise a torquemeter or a strain gauge.

The processing computer may comprise one or more computers configured to be embedded or not in the mechanical system.

The alerter may comprise a standard means for emitting a visual alarm, such as a diode or a screen, for example, an audible alarm, such as a loudspeaker, for example, and/or a vibratory or tactile alarm, such as a haptic device, for example, etc.

The invention also relates to an apparatus comprising an aircraft provided with a rotating part and with at least one free-wheel, said free-wheel comprising a driving part integrated into an upstream mechanical power transmission system connected to an engine, said free-wheel comprising a driven part integrated into a downstream mechanical power transmission system connected at least to the rotating part. This apparatus is further provided with a monitoring system according to the invention. For example, the rotating part is a rotor, of a rotary wing or for controlling the movement of the aircraft, for example.

According to one option, the processing computer is embedded on the aircraft. The processing computer may comprise one or more computers, all of which are embedded on the aircraft.

Similarly, the alerter may or may not be embedded on the aircraft.

According to one option, the processing computer may comprise:

a first computer embedded on said aircraft, the first computer being connected to the first measuring device and optionally to the second measuring device and being configured to optionally carry out said determination of an oscillation measurement and said determination of a value of at least one dynamic parameter; and a second computer not embedded on the aircraft communicating with the first computer and the alerter, said second computer being configured to carry out said generation of an alarm when said value of said at least one dynamic parameter reaches at least one wear threshold associated with said at least one dynamic parameter and stored in the processing computer.

The alerter may not be embedded.

The first computer may comprise a single computer or several computers.

For example, a system known by the acronym FADEC, corresponding to the expression "Full Authority Digital Engine Control", may comprise a computer and a sensor for determining the speed of rotation of an engine, or even a sensor for measuring the speed of rotation of a rotor mast. The sensors used by a FADEC system have the advantage of having maximized reliability and of being equipped with devices making it possible to avoid undetected failures, which can tend to obtain a system for determining wear in a reliable free-wheel. A computer of a system known by the acronym HUMS, corresponding to the expression "Health and Usage Monitoring Systems", can compile the rotational speed measurements of the engine, or even of the rotor mast, in order to establish the oscillation measurement.

In a fully on-board architecture, the computer of the HUMS system or another on-board computer can deduce therefrom the presence of wear requiring a maintenance operation.

In a partially remote architecture, a second computer can communicate with the first computer and, for example, a computer of a HUMS system, either directly via wired or wireless links, or via mobile data storage devices. For example, a hard disk or equivalent is connected to the first computer to store the value of each dynamic parameter, or even the oscillation measurement, and is then connected to the second computer in order to proceed with the method.

According to one example, the system for monitoring a free-wheel comprises two sensors for detecting the speed of rotation of an engine and of a rotor, a computer of a FADEC system which calculates the speeds of rotation of the engine and of the rotor based on the data transmitted by the speed sensors, a computer of a HUMS system which establishes the oscillation measurement and calculates the value of each dynamic parameter, and a computer of a ground station that makes it possible to compare each dynamic parameter with its wear threshold in order to generate an alarm, if necessary.

According to one option, neither the processing computer nor the alerter, nor even the measuring device or devices, belong to the system to be monitored and, for example, to an aircraft.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements present in more than one of the figures are given the same references in each of them.

Figure 1:
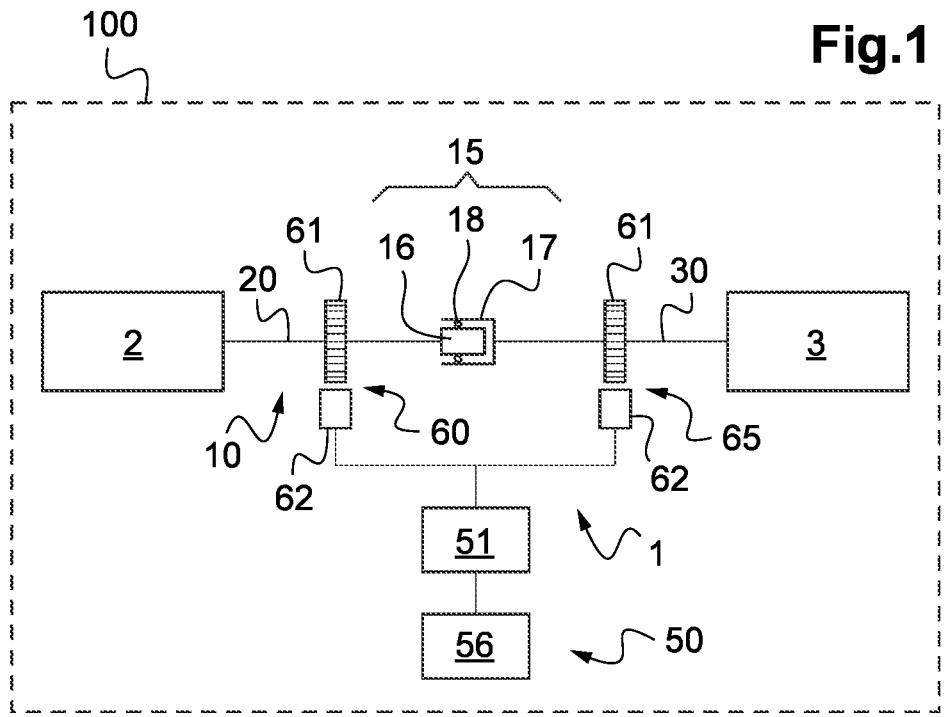
FIG. 1 is an example of a mechanical system comprising a monitoring system according to the invention.

FIG. 1 shows an apparatus 100 comprising a mechanical system 1 that includes a rotating part 3.

In order to set the rotating part 3 in rotation, the mechanical system 1 includes a power plant. This power plant has at least one engine 2 connected by a mechanical power transmission system 10 to at least the rotating part 3.

Furthermore, the mechanical power transmission system 10 comprises at least one free-wheel 15 per engine, each free-wheel 15 being interposed mechanically between a rotating member of the engine 2 and the rotating part 3.

Regardless of the number of free-wheels 15, each free-wheel 15 comprises a driving part 16 and a driven part 17. Standard connecting pieces 18, such as rollers running on tracks, for example, connect the driving part 16 and the driven part 17 in rotation when the driving part 16 tends to rotate faster than the driven part 17. On the other hand, when the driven part 17 rotates faster than the driving part 16, said connecting pieces rotationally disengage the driving part 16 and the driven part 17. Therefore, the mechanical power transmission system 10 comprises an upstream mechanical power transmission system 20 that includes the driving part 16 and extends up to a member of the engine 2, or even into the engine 2.

Similarly, the mechanical power transmission system 10 comprises a downstream mechanical power transmission system 30 that includes the driven part 17 and extends up to the rotating part 3, and possibly as far as other rotating elements.

According to another aspect, a monitoring system 50 is configured to implement the method according to the invention described below.

This monitoring system 50 may comprise one first measuring device 60 per free-wheel for measuring a value of a first monitoring parameter at the upstream 20 or downstream 30 mechanical power transmission system, and within the upstream mechanical power transmission system 20 according to the examples shown. The monitoring system 50 may comprise a second measuring device 65 for measuring the value of this same monitoring parameter at the upstream 20 or downstream 30 mechanical power transmission system not provided with the first measuring device 60. Each measuring device 60, 65 may comprise an element secured to a rotating member of the mechanical power transmission system 20, 30 in question.

According to one example, the first monitoring parameter and, if appropriate, the second monitoring parameter are speeds of rotation V of two respective members. Thus, each measuring device 60, 65 may include a sensor 62 capable of emitting a signal, for example an analog or digital, electrical or optical signal representative of a speed of rotation.

According to one possibility shown in FIG. 1, each measuring device 60, 65 comprises an encoder wheel 61 secured to the rotary member to be studied and a standard sensor 62 opposite the encoder wheel 61, said sensor 62 emitting a measurement signal, for example an analog or digital, electrical or optical signal representative of the speed of rotation of the encoder wheel 61 and therefore of said rotary member.

According to another possibility, each measuring device comprises an accelerometer measuring an acceleration due to unbalance or to meshing, the frequency of which is representative of the speed of rotation of the associated mechanical power transmission system.

According to one example, the first monitoring parameter and, where appropriate, the second monitoring parameter each represent an angular position pos of a respective member relative to a reference. Thus, each measuring device 60, 65 may include a position sensor capable of emitting a signal, for example an analog or digital, electrical or optical signal representative of a position.

According to one example, the first monitoring parameter and, if appropriate, the second monitoring parameter are angular accelerations acc of two respective members. Thus, each measuring device 60, 65 may include an acceleration sensor capable of emitting a signal, for example an analog or digital, electrical or optical signal representative of an acceleration.

According to another example, the first monitoring parameter and, where appropriate, the second monitoring parameter are mechanical torques Tq exerted on two respective rotating members. Thus, each measuring device 60, 65 includes a standard torquemeter secured to the rotating member and capable of emitting an analog, digital, electrical or optical signal representative of a mechanical torque.

According to another example, the first monitoring parameter and, where appropriate, the second monitoring parameter are two mechanical stresses C exerted on two respective rotating members. Thus, each measuring device 60, 65 includes a standard strain gauge secured to the rotating member and capable of emitting an analog, digital, electrical or optical signal representative of a mechanical strain.

When the first monitoring parameter and, where appropriate, the second monitoring parameter are not of the "speed of rotation" type, the system may comprise the first measuring device 60, or even the second measuring device 65, plus sensors for measuring the speed of rotation of the upstream 20 and downstream 30 mechanical transmission systems.

Furthermore, the monitoring system 50 is provided with a processing computer 51 connected by a wired or wireless link to the first measuring device 60 and, where appropriate, to the second measuring device 65. The processing computer 51 may include a member executing stored instructions in order to apply the implemented method. The processing computer 51 may comprise a single computer or several computers. For example, the computer or computers of the processing computer 51 may comprise at least one processor and at least one memory, at least one integrated circuit, at least one programmable system, or at least one logic circuit, these examples not limiting the scope given to the expression "computer". The term "processor" may refer equally to a central processing unit or CPU, a graphics processing unit or GPU, a digital signal processor or DSP, a microcontroller, etc.

According to another aspect, the monitoring system 50 includes an alerter 56 cooperating with the processing computer 51. The alerter 56 may comprise a display screen or a diode or equivalent for generating a visual alarm, a haptic system, a sound system, a vibratory system, etc. The alerter 56 may be connected by a wired or wireless link to the processing computer 51 or may communicate with this processing computer 51 via mobile memories storing data in various forms.

Each measuring device and/or one or more computers of the processing computer and/or the alerter may form part of the mechanical system 1 or may be independent of the mechanical system 1, possibly being arranged on the mechanical system 1 only during a measurement.

FIG. 1 shows a monitoring system 50 cooperating with a simple mechanical system 1.

Nevertheless, the invention can be used to study freewheels arranged within any type of system and possibly arranged within the equipment of a mechanical system. This mechanical power transmission system 10 may comprise at least one power transmission shaft, at least one gearbox, at least one mechanical connection member, at least one gear, a rotor mast extending from a gearbox to a rotor, etc.

Figure 2:
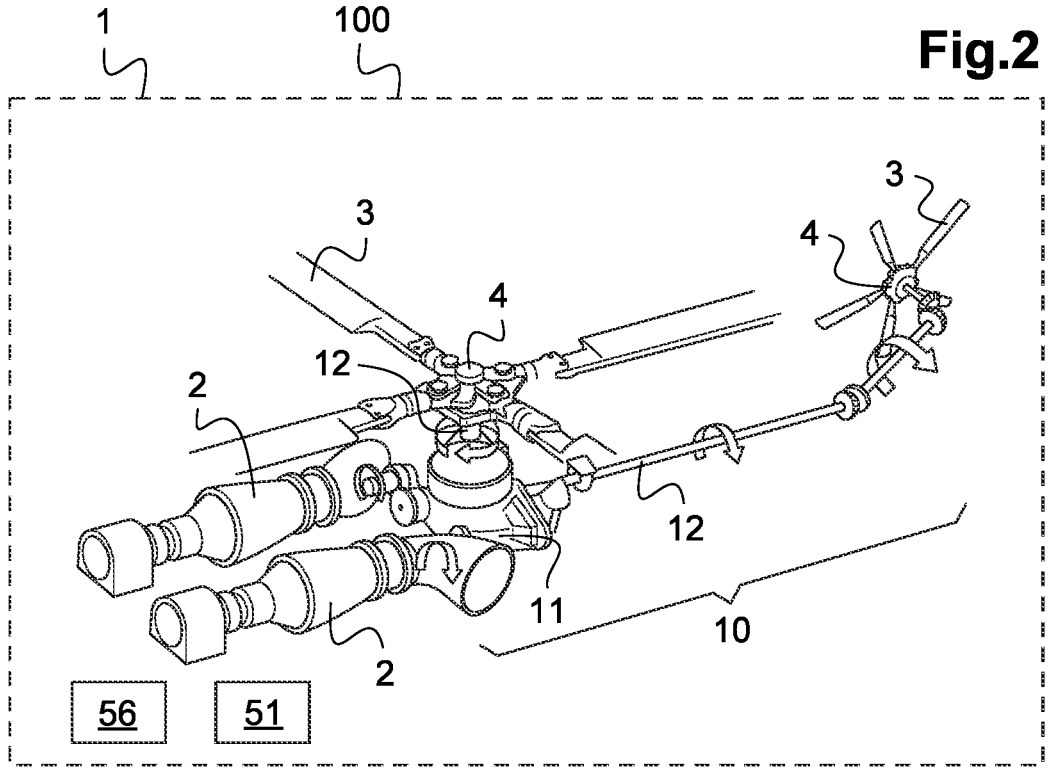
FIG. 2 is an example of an aircraft comprising a monitoring system according to the invention.
Figure 3:
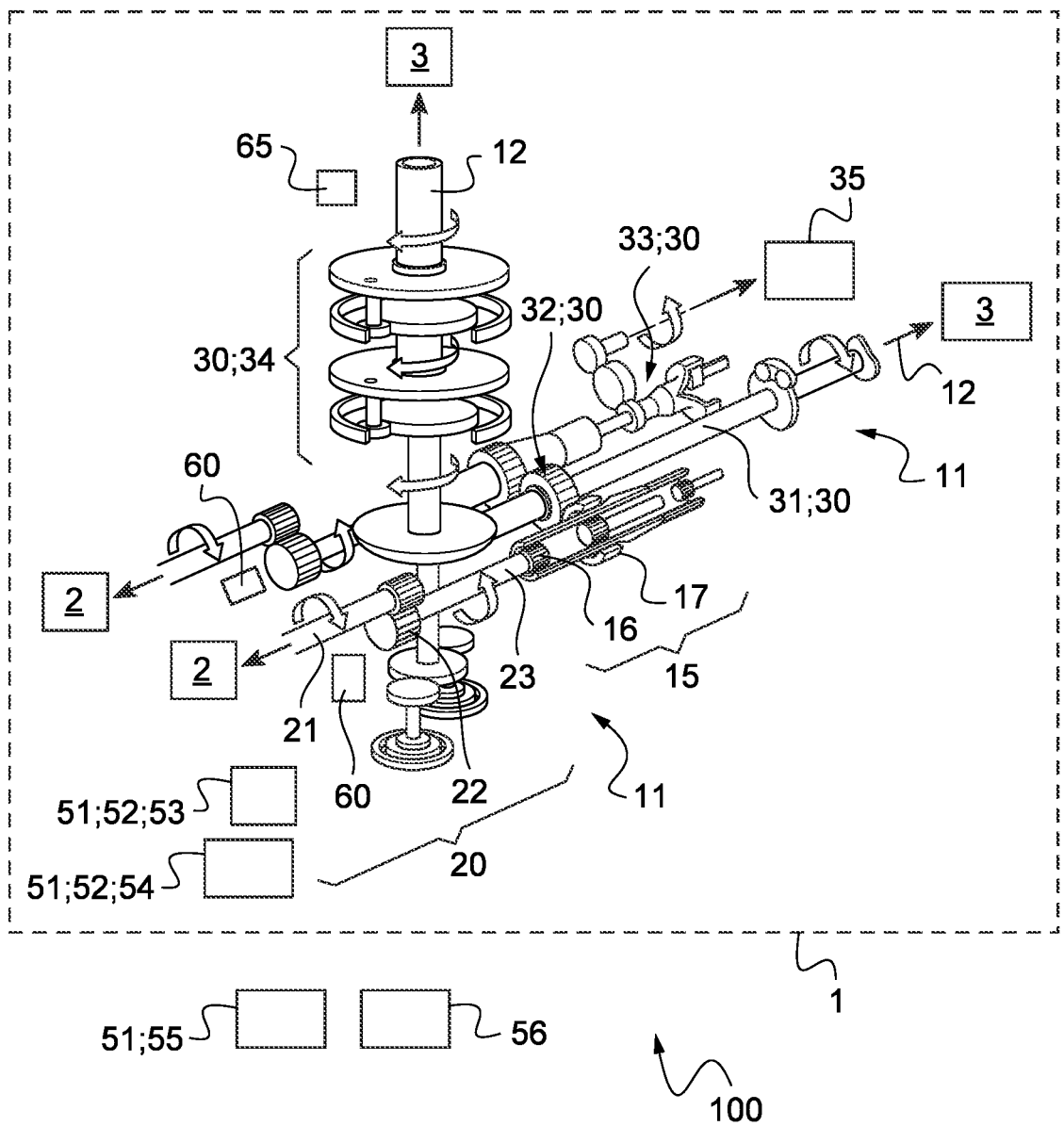
FIG. 3 is an example of an aircraft comprising a monitoring system according to the invention.

According to the example of FIGS. 2 and 3, the mechanical system 1 may be an aircraft. This aircraft comprises at least one rotating part 3 of the rotor type 4 set in motion by at least one engine 2, via at least one free-wheel per engine 2 and possibly at least via one gearbox 11.

Each free-wheel 15 is mechanically interposed between a rotating member of an engine 2 and a rotating part 3. FIG. 1 thus shows a power plant with an engine 2 and a free-wheel 15 while FIGS. 2 and 3 provide the example of a power plant having two engines 2 and two free-wheels 15 for setting at least one rotating part 3 in motion.

Where appropriate and in accordance with the illustration of FIG. 3, each free-wheel 15 may be arranged, for example, inside a possible gearbox 11. Alternatively, each free-wheel 15 may be arranged outside such a possible gearbox 11, or even in an engine 2.

For example, and with reference to FIG. 3, the upstream mechanical power transmission system 20 may include an output shaft 21 of the engine 2, at least one other shaft 23, at least one gear 22, or at least one mechanical connection member, one or more of the above-mentioned members being able to extend into a gearbox 11 or into the engine 2.

According to the example of FIG. 3, the downstream mechanical power transmission system 30 may be connected to rotating elements 35 such as an accessory gearbox, a pump, etc. For example, the downstream mechanical power transmission system 30 comprises a shaft 31, at least one gear 32, at least one speed reduction system 34, at least one rotor mast 12, at least one mechanical connection member, etc. One or more of the above-mentioned members may or may not extend into the gearbox 11.

Furthermore, each measuring device 60, 65 may comprise an element secured to a rotating member of the mechanical power transmission system 20, 30 in question, outside or inside a gearbox 11 or even in the engine 2. Within the downstream mechanical power transmission system 30, the measuring device 60, 65 in question may be arranged, for example, on a rotor mast 12, but may also be arranged on a portion 33 of the downstream mechanical power transmission system 30 leading not to the rotating part 3 but to ancillary equipment 35. Each measuring device 60, 65 may advantageously be arranged as close as possible to the free-wheel 15 to be monitored, or even on the free-wheel 15. In the presence of several free-wheels, the monitoring system 50 may comprise, for example, one first measuring device 60 per free-wheel 15, and possibly one or more second measuring devices 65. As shown in FIG. 3, it is in particular possible to arrange a single second measuring device 65 at a member set in motion by all the free-wheels 15, a rotor mast 12, for example.

In addition, and in the case of a system 1 of the aircraft type, the computer or computers of the processing computer 51 may all be embedded on the aircraft 1 or at least one computer may be located outside the aircraft 1. FIG. 2 shows a processing computer 51 arranged entirely in the aircraft 1. On the contrary, FIG. 3 shows a processing computer 51 comprising a first computer 52 arranged in the aircraft 1 and a second computer 55 remote from the aircraft 1. For example, the first computer 52 comprises an engine computer 53 of a FADEC system and a monitoring computer 54 of a HUMS system.

The alerter 56 may or may not be embedded on the aircraft 1. For example, as shown in FIG. 3, the alerter 56 is remote from the aircraft 1 and communicates with the second computer 55.

Figure 4:
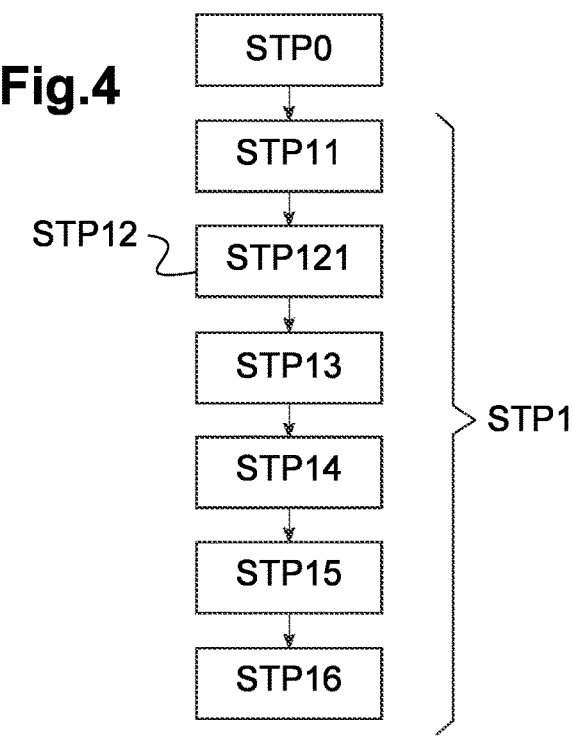
FIG. 4 is a flow chart showing the method of the invention.

FIG. 4 illustrates the method according to the invention capable of being implemented by a monitoring system 50 for monitoring the wear of one or more free-wheels 15. The following explanations are given for one free-wheel 15 but the method is applicable to each free-wheel 15.

This method thus comprises an analysis phase STP1 during which the wear of a free-wheel 15 is evaluated.

Prior to this analysis phase STP1, the method may include a step STP0 of detecting the engagement of the free-wheel 15. The analysis phase STP1 is optionally triggered only when the free-wheel 15 is engaged or just before or just after it is engaged.

Figure 5:
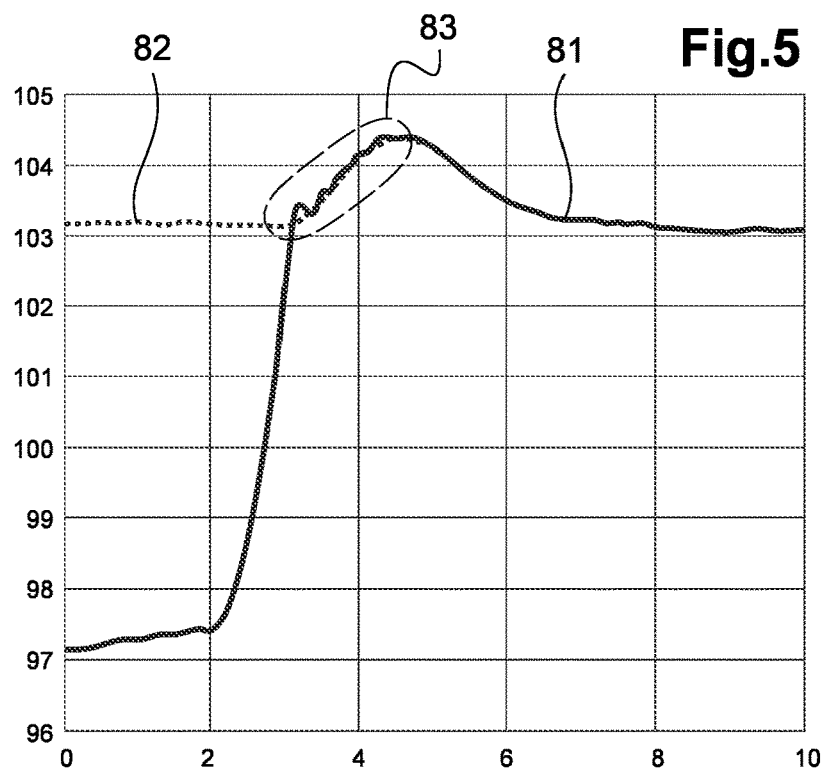
FIG. 5 is a graph showing an engagement phase of a free-wheel.

FIG. 5 shows a graph comprising speeds of rotation on the ordinate and time on the abscissa. A first speed curve 81 shows an example of the first speed of rotation of a rotating member of the upstream mechanical power transmission system 20 while a second speed curve 82 shows an example of the second speed of rotation of a rotating member of the downstream mechanical power transmission system 30. According to one variant, the analysis phase STP1 is carried out only in the zone 83 in which the first speed curve 81 tends towards the second speed curve 82. For example, this transient phase begins when the first speed of rotation is equal to the second speed of rotation plus or minus a margin and optionally ends at the end of a predetermined time or when the first speed of rotation is substantially equal to the second speed of rotation for a predetermined time.

Regardless of the presence or absence of step STP0 and with reference to FIG. 4, the method may comprise a step STP11 of measuring and indeed storing at least the value of the first monitoring parameter within the upstream 20 or downstream 30 mechanical transmission system with the first measuring device 60 and even measuring and indeed storing the value of the second monitoring parameter within the upstream 20 or downstream 30 mechanical transmission system with the second measuring device 65. For example, the processing computer 51 and, according to the example of FIG. 3, the engine computer 53, determines said value or values by decoding the signals originating from the first measuring device 60, or even from the second measuring device 65.

In addition, and with reference to FIG. 4, the method then includes a step STP12 of determining an oscillation measurement.

Figure 6:
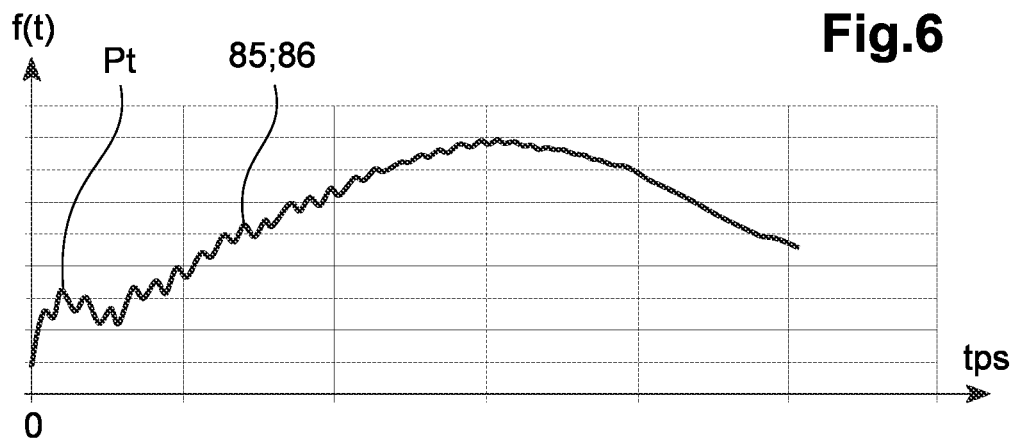
FIG. 6 is a graph showing an oscillation measurement corresponding to the first unfiltered and unprocessed measurement signal.

With reference to FIG. 6, using the measurements that have been taken, the processing computer 51 and, for example, the monitoring computer 54 according to FIG. 2, establishes an oscillation measurement 85, represented by a curve in a graph showing the monitoring parameter on the ordinate and time on the abscissa.

According to a variant shown in FIG. 6, the oscillation measurement 85 is in the form of a continuous curve of a value f (t) as a function of time tps that is equal to the first measurement signal 86 of the first monitoring parameter within the upstream 20 or downstream 30 power transmission system.

Alternatively, the processing computer can sample the first measurement signal 86 in order to obtain a succession of measurement points pt as a function of time, these measurement points pt being the subject of a conversion by the processing computer, for example. The oscillation measurement 85 may be in the form of this series of measurement points, which are optionally converted.

Figure 7:
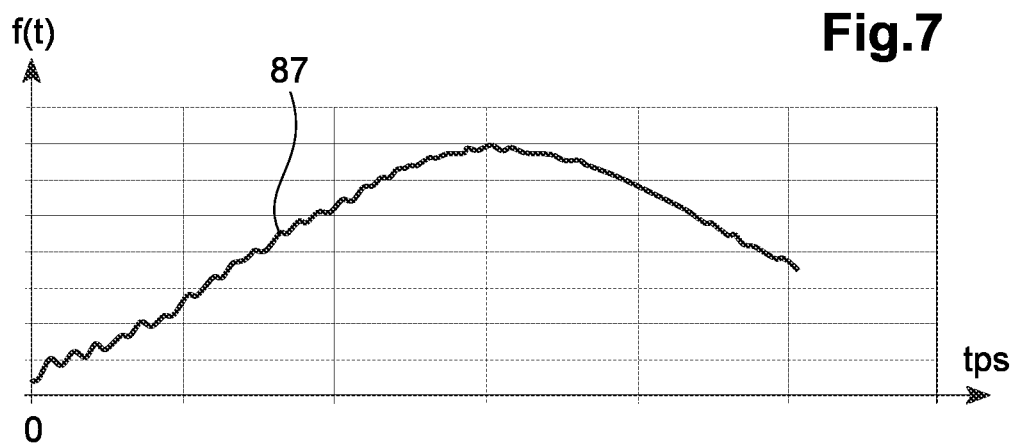
FIG. 7 is a graph showing a second measurement signal.

According to another variant shown in FIG. 7, during a filtering step STP121, the first measurement signal is filtered directly or indirectly by subtracting a second measurement signal measuring the second monitoring parameter. For example, the oscillation measurement 85 corresponds point by point to the first measurement signal 86 minus the second measurement signal 87, or vice versa.

Figure 8:
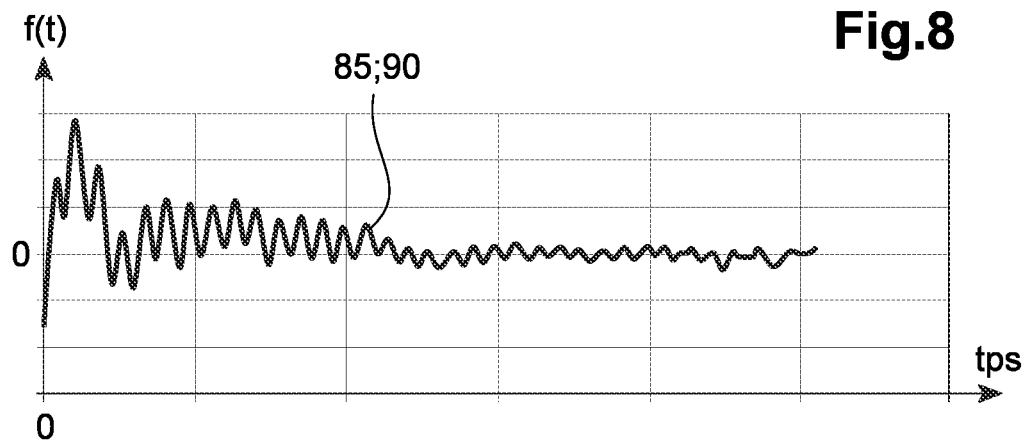
FIG. 8 is a graph showing an oscillation measurement obtained by subtracting the second measurement signal of FIG. 7 from the first measurement signal of FIG. 6.

FIG. 8 shows an oscillation measurement 85 obtained in a time reference frame by subtracting the second measurement signal of FIG. 7 from the first measurement signal of FIG. 6.

Alternatively, the processing computer may sample the signal shown in FIG. 8 in order to obtain a succession of measurement points as a function of time, these measurement points being the subject of a conversion by the processing computer, for example. The oscillation measurement 85 may be in the form of this series of measurement points, which may or may not be converted.

Alternatively, the processing computer may sample the first measurement signal 86 and the second measurement signal 87 in order to obtain a succession of measurement points, these measurement points being the subject of a conversion by the processing computer, for example. The oscillation measurement 85 may be in the form of the first series of measurement points, resulting from the first measurement signal, which are optionally converted, minus the second series of measurement points, resulting from the second measurement signal, which are optionally converted.

The above examples are given by way of illustration.

With reference to FIG. 4, the processing computer 51 then implements a step STP13 of determining a value of at least one dynamic parameter L, omg, ft, amp corresponding to a characteristic of the oscillation measurement, directly in a time reference frame or indirectly in a frequency reference frame, by spectral analysis, Fourier transform or other means.

With reference to FIG. 8, for example, when the oscillation measurement is expressed in a time reference frame, the processing computer 51 and, for example, the monitoring computer 54 according to the example of FIG. 2, can determine the equation of a mathematical function 90 that can be substantially superimposed on the oscillation measurement 85, namely a mathematical function that is separated from the oscillation measurement by a difference corresponding to a minimized error.

This equation of the mathematical function 90 may be stored in the processing computer 51 and may contain one or more dynamic parameters as variables. A dynamic parameter may be a pseudo-pulse omg or a damping coefficient L.

For example, the mathematical function 90 is a function representing a torsionally-dampened oscillator and in the following form:

$$V=X*(-L*\exp(-L*t)*\cos(omg*t+phi)-omg*\exp(-L*t)*\sin(omg*t+phi))$$

where "V" represents the monitoring parameter and, for example, a speed of rotation, "t" represents time, "X" represents an amplitude, "L" represents a dynamic parameter of the damping coefficient type, "omg" represents a dynamic parameter of the pseudo-pulse type, "phi" represents a phase, "exp" represents the exponential function, "cos" represents the cosine function, "sin" represents the sine function, "=" represents the equals sign, "*" represents the multiplication sign, "+" represents the addition sign, "−" represents the subtraction sign.

According to one method, the mathematical function 90, namely its equation, is stored in the processing computer 51, and the processing computer 51 adjusts the value of each dynamic parameter such that the mathematical function 90 corresponds to the oscillation measurement 85.

Figure 9:
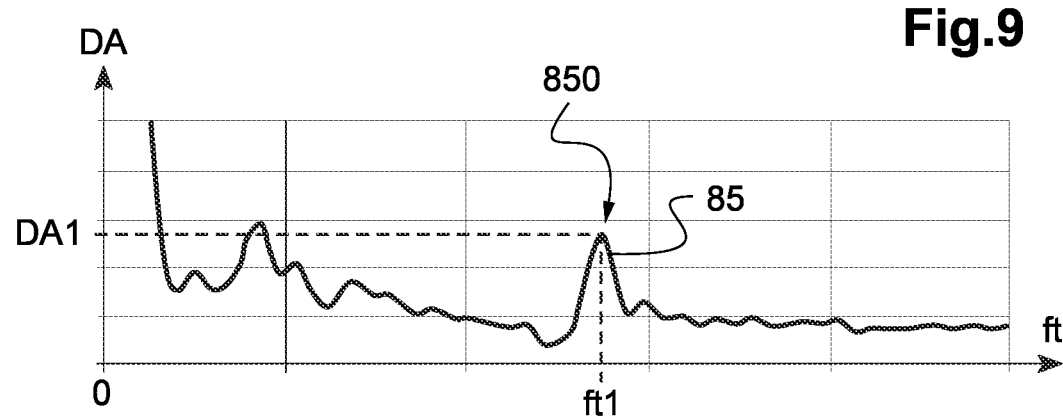
FIG. 9 is a graph showing the oscillation measurement of FIG. 6 transformed by a Fourier transform.
Figure 10:
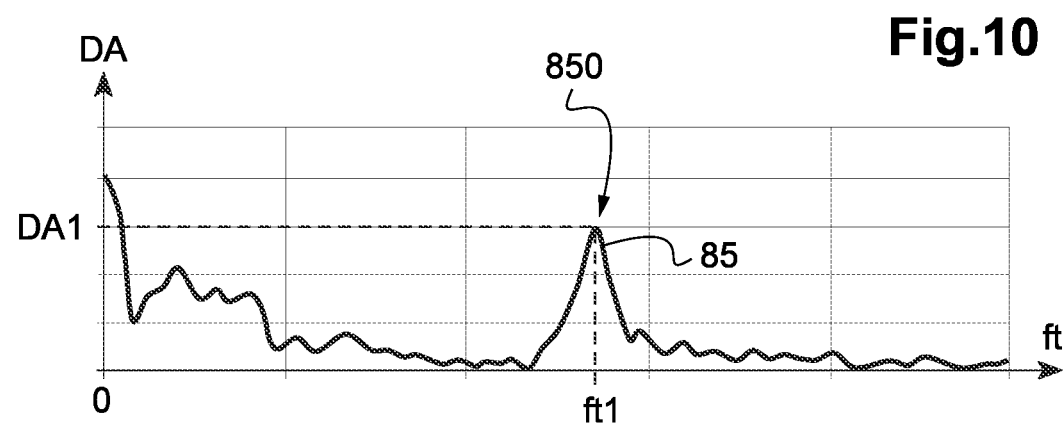
FIG. 10 is a graph showing the oscillation measurement of FIG. 8 transformed by a Fourier transform.

Alternatively, the oscillation measurement 85 may be transformed to be represented in a frequency reference frame. FIGS. 9 and 10 respectively illustrate the transform of the oscillation measurement of FIGS. 6 and 8 obtained by Fourier transform. In the frequency reference frame, the transform of the oscillation measurement has an amplitude density DA as a function of frequencies ft. The method then comprises a step of identifying a value of said at least one dynamic parameter of this transform of the oscillation measurement in the frequency reference frame.

At least one dynamic parameter may be a frequency ft1 or an amplitude density Da1 of a predetermined spectral line 850 of said transform of the oscillation measurement in a frequency reference frame. For example, this spectral line 850 corresponds to the peak present in a predetermined frequency range. Thus, a dynamic parameter may be a frequency taking the value ft1 of this peak and/or a dynamic parameter may be an amplitude density DA1 of this peak.

Consequently, and with reference to FIG. 4, the method comprises a step STP15 of generating an alarm with the alerter 56 when said value of said at least one dynamic parameter ft, L, omg, amp reaches a wear threshold Samp, SL, Somg, Sft.

For example, during a prior step STP14, the processing computer 51 and, for example, the second computer 55 according to the example of FIG. 3, compares the value of each dynamic parameter with its wear threshold.

According to the example of FIG. 8, if the pseudo-pulse omg reaches a pseudo-pulse threshold Somg or if the damping coefficient L reaches a damping threshold SL, an alarm is emitted by the alerter 56. For example, under normal conditions, the pseudo-pulse omg lies between two predetermined thresholds; if one of these two thresholds is reached, the alarm is generated.

According to the examples of FIGS. 9 and 10, if the frequency ft1 reaches a frequency threshold Sft or if the amplitude density DA1 reaches an amplitude density threshold, the processing computer instructs the alerter to generate an alarm. For example, under normal conditions, the frequency ft1 lies between two predetermined thresholds. If one of these two thresholds is reached, the alarm is generated.

During the prior step STP14, the processing computer 51 can estimate a remaining service life of the free-wheel 15 as a function of a difference between the value of each dynamic parameter ft, amp, L, omg and at least one wear threshold Sft, SL, Somg, Samp. If the service life is zero or negative, an alarm is generated. The service life may be displayed on a display and/or stored.

If an alarm is generated, a maintenance step STP16 can be triggered to inspect the free-wheel 15 and possibly replace it.

Naturally, the present invention is subject to numerous variations as regards its implementation. Although several implementations are described above, it should readily be understood that an exhaustive identification of all possible embodiments is not conceivable. It is naturally possible to replace any of the means described with equivalent means without going beyond the ambit of the present invention.

What is claimed is:

1. A method for detecting wear before failure of a free-wheel of a mechanical system, the mechanical system being provided with a rotating part to be rotated with an engine, the free-wheel comprising a driving part integrated into an upstream mechanical power transmission system connected to the engine, the free-wheel further comprising a driven part integrated into a downstream mechanical power transmission system connected at least to the rotating part, the method comprising:
   triggering, with a processing computer, an analysis phase in response to the free-wheel changing from being disengaged to being engaged upon the driving part beginning to drive the driven part;
   causing, by the processing computer, the following steps to be performed only during the analysis phase within a time interval following the free-wheel changing from being disengaged to being engaged:
   determining an oscillation measurement varying as a function of time of a first monitoring parameter within the upstream or downstream mechanical power transmission system, using at least one first measuring device, the oscillation measurement being dependent on a level of wear of the free-wheel; and
   determining a value of at least one dynamic parameter, with the processing computer, the at least one dynamic parameter being a characteristic of the oscillation measurement in a time reference frame or a characteristic of a transform of the oscillation measurement in a frequency reference frame; and
   the method further comprising generating, with an alerter in communication with the processing computer, an alarm when the value of the at least one dynamic parameter reaches at least one free-wheel wear threshold associated with the dynamic parameter and stored in the processing computer.

2. The method according to claim 1
wherein the at least one free-wheel wear threshold is a threshold reached when the free-wheel is worn and not slipping.

3. The method according to claim 1
wherein the first monitoring parameter is a physical parameter of a rotating member within the upstream or downstream mechanical power transmission system, the physical parameter being a speed of rotation, angular position, angular acceleration, mechanical torque or mechanical stress of the rotating member within the upstream or downstream mechanical power transmission system.

4. The method according to claim 1
wherein the determination of an oscillation measurement comprises producing a first measurement signal as a function of time with the first measuring device, the oscillation measurement being:
either a continuous curve as a function of time corresponding to the first unfiltered measurement signal;

or a continuous curve as a function of time corresponding to the first measurement signal filtered at least by subtracting a second measurement signal generated by a second measuring device measuring a second monitoring parameter within the upstream or downstream mechanical power transmission system that is not the subject of the first monitoring parameter, the first monitoring parameter and the second monitoring parameter being relative to the same physical parameter.

5. The method according to claim 1 wherein the determination of an oscillation measurement includes the following steps:

producing a first measurement signal as a function of time with the first measuring device, the first measurement signal being unfiltered or filtered at least by subtracting a second measurement signal as a function of time generated by a second measuring device measuring a second monitoring parameter within the upstream or downstream mechanical power transmission system that is not the subject of the first monitoring parameter, the first monitoring parameter and the second monitoring parameter being relative to the same physical parameter; and generating a plurality of measurement points as a function of time by sampling the filtered or unfiltered first measurement signal, the oscillation measurement being a discontinuous oscillation curve as a function of time comprising the measurement points.

6. The method according to claim 1 wherein the determination of an oscillation measurement includes the following steps:

generating a first measurement signal as a function of time with the first measuring device;

generating a plurality of first intermediate points by sampling the first measurement signal;

producing a second measurement signal with a second measuring device measuring a second monitoring parameter within the upstream or downstream mechanical power transmission system that is not the subject of the first monitoring parameter, the first monitoring parameter and the second monitoring parameter being relative to the same physical parameter;

generating a plurality of second intermediate points by sampling the second measurement signal; and generating a plurality of measurement points by subtracting the second intermediate points from the first intermediate points, the oscillation measurement being a discontinuous oscillating curve as a function of time comprising the measurement points.

7. The method according to claim 1 wherein the at least one dynamic parameter comprises a pseudo-pulse of the oscillation measurement, the associated free-wheel wear threshold being a pseudo-pulse threshold.

8. The method according to claim 1 wherein the at least one dynamic parameter comprises a damping coefficient of the oscillation measurement, the associated free-wheel wear threshold being a damping threshold.

9. The method according to claim 1 wherein the determination of a value of at least one dynamic parameter in the time reference frame comprises the following step: adjusting a value of the at least one dynamic parameter within a mathematical function stored in the processing computer so that the mathematical function is separated from a function described by the oscillation measurement by a space less than a threshold.

10. The method according to claim 9 wherein, the first monitoring parameter being a speed of rotation, the mathematical function is of the following form:

$$V=X*(-L*\exp(-L*t)*\cos(omg*t+phi)-omg*\exp(-L*t)*\sin(omg*t+phi))$$

where "V" represents a speed on the ordinate in a graph showing time t on the abscissa, "t" represents time, "X" represents an amplitude, "L" represents a dynamic parameter of the damping coefficient type, "omg" represents a dynamic parameter of the pseudo-pulse type, "phi" represents a phase, "exp" represents the exponential function, "cos" represents the cosine function, "sin" represents the sine function, "=" represents the equals sign, "*" represents the multiplication sign, "+" represents the addition sign, "−" represents the subtraction sign.

11. The method according to claim 1 wherein the determination of a value of at least one dynamic parameter in the frequency reference frame comprises the following step: identifying a value of the at least one dynamic parameter of the transform of the oscillation measurement in a frequency reference frame.

12. The method according to claim 11 wherein the transform of the oscillation measurement in a frequency reference frame comprises providing an amplitude density as a function of frequencies, the identification of a value of at least one dynamic parameter comprises the determination at least of one frequency or of one amplitude density of a predetermined spectral line of the transform of the oscillation measurement, the at least one dynamic parameter being the frequency or the amplitude density.

13. The method according to claim 1 wherein the method includes a step of determining a remaining service life of the free-wheel as a function of a difference between the value of the at least one dynamic parameter and the associated free-wheel wear threshold.

14. A monitoring system for detecting wear before failure of a free-wheel of a mechanical system, the mechanical system being further provided with an engine and a rotating part, the free-wheel including a driving part integrated into an upstream mechanical power transmission system connected to the engine, the free-wheel further including a driven part integrated into a downstream mechanical power transmission system connected at least to the rotating part, the monitoring system comprising:

a first measuring device configured to measure a first monitoring parameter within the upstream or downstream mechanical power transmission system;

a processing computer configured to, in response to the free-wheel changing from being disengaged to being engaged upon the driving part beginning to drive the driven part, determine within a time interval following the free-wheel being engaged an oscillation measurement varying as a function of time of the first monitoring parameter, the oscillation measurement being dependent on a level of wear of the free-wheel;

the processing computer further configured to determine a value of at least one dynamic parameter, the at least one dynamic parameter being a characteristic of the oscillation measurement in a time reference frame or a characteristic of a transform of the oscillation measurement in a frequency reference frame; and an alerter configured to generate an alarm when the value of the at least one dynamic parameter reaches at least one free-wheel wear threshold associated with the dynamic parameter.

15. The monitoring system according to claim 14 further comprising:

a second measuring device configured to measure a second monitoring parameter within the upstream or downstream mechanical power transmission system that is not the subject of the first monitoring parameter.

16. An apparatus comprising:

an aircraft provided with an engine, a rotating part including a rotor, and a mechanical power transmission system connecting the engine and the rotating part, the mechanical power transmission system including an upstream mechanical power transmission system connected to the engine and a downstream mechanical power transmission system connected at least to the rotating part;

the aircraft further provided with at least one free-wheel, the free-wheel including a driving part integrated into the upstream mechanical power transmission system connected to the engine, the free-wheel further including a driven part integrated into the downstream mechanical power transmission system connected at least to the rotating part;

the apparatus further comprising a monitoring system for detecting wear before failure of the free-wheel, the monitoring system including:

a first measuring device configured to measure a first monitoring parameter within the upstream or downstream mechanical power transmission system;

a processing computer configured to, in response to the free-wheel changing from being disengaged to being engaged upon the driving part beginning to drive the driven part, determine within a time interval following the free-wheel being engaged an oscillation measurement varying as a function of time of the first monitoring parameter, the oscillation measurement being dependent on a level of wear of the free-wheel;

the processing computer further configured to determine a value of at least one dynamic parameter, the at least one dynamic parameter being a characteristic of the oscillation measurement in a time reference frame or a characteristic of a transform of the oscillation measurement in a frequency reference frame; and an alerter configured to generate an alarm when the value of the at least one dynamic parameter reaches at least one free-wheel wear threshold associated with the dynamic parameter.

17. The apparatus according to claim 16 wherein at least the processing computer or the alerter is embedded on the aircraft.

18. The apparatus according to claim 16 wherein the processing computer comprises:

a first computer embedded on the aircraft, the first computer being connected to the first measuring device and being configured to carry out the determination of a value of at least one dynamic parameter; and a second computer not embedded on the aircraft communicating with the first computer and the alerter, the second computer being configured to carry out the generation of an alarm when the value of the at least one dynamic parameter reaches at least one wear threshold associated with the dynamic parameter.

19. The monitoring system according to claim 14 wherein the first monitoring parameter is a physical parameter of a rotating member within the upstream or downstream mechanical power transmission system, the physical parameter being a speed of rotation, angular position, angular acceleration, mechanical torque, or mechanical stress of the rotating member within the upstream or downstream mechanical power transmission system.

20. The apparatus according to claim 16 wherein the first monitoring parameter is a physical parameter of a rotating member within the upstream or downstream mechanical power transmission system, the physical parameter being a speed of rotation, angular position, angular acceleration, mechanical torque, or mechanical stress of the rotating member within the upstream or downstream mechanical power transmission system.

* * * * *